Nov. 20, 1962 K. K. STANGE ETAL 3,064,969

POWER STACKER

Filed Aug. 16, 1960 5 Sheets-Sheet 1

INVENTORS
K. K. STANGE
R. D. DURAND
BY Elmer Galbiati
AGENT

Nov. 20, 1962 K. K. STANGE ETAL 3,064,969

POWER STACKER

Filed Aug. 16, 1960 5 Sheets-Sheet 2

Nov. 20, 1962 K. K. STANGE ETAL 3,064,969

POWER STACKER

Filed Aug. 16, 1960 5 Sheets-Sheet 3

Nov. 20, 1962 K. K. STANGE ETAL 3,064,969

POWER STACKER

Filed Aug. 16, 1960 5 Sheets-Sheet 4

3,064,969
Patented Nov. 20, 1962

3,064,969
POWER STACKER

Klaus K. Stange, Hyde Park, and Robert D. Durand, Pleasant Valley, N.Y., assignors to International Business Machines Corporation, New York, N.Y., a corporation of New York Filed Aug. 16, 1960, Ser. No. 49,916
7 Claims. (Cl. 271—71)

This invention relates to document transport systems and more particularly to a device for rapidly stacking fast moving documents.

Generally, in most stackers where the documents are successively fed into a stacker pocket, gravity can be relied upon to remove each document from the path of the next incoming document. However, in high speed devices gravity does not act fast enough to prevent jamming. Hence, some power means must be provided to remove each document from the path of the next incoming document.

Various means, such as a pair of rotating helices whose spiral grooves engage the sides of the documents have been employed by the prior art to force the documents down into the stacker pocket; however, when the speed of the system is increased beyond a certain critical speed, or if mutilated documents are encountered, systems of the above type have a tendency to jam and to further mutilate the documents. Furthermore, the location, spacing and speed of the helices in systems of the above type generally present difficult adjustment problems.

The prior art is also replete with stackers wherein the forward motion of the document is terminated by having the front end of the document engage a fixed stop. Systems of this type operate satisfactorily so long as the documents are moving at a relatively slow linear speed; however, if a fixed stop is used in a system wherein the documents are moving at high speed, the documents have a tendency to collapse (like an accordion) and jam the system.

In order to appreciate the significance of the present invention, it is necessary to visualize the speed at which the documents handled are moving. Linear speeds of twenty-six hundred feet per minute and time intervals of less than thirty milliseconds between documents are contemplated. When operating at such speeds, the ordinary means of handling documents are completely inadequate.

It is an object of the present invention to provide an improved high-speed document stacker.

It is a further object of the present invention to provide a stacker which can handle documents of various sizes and thicknesses which are interspersed.

It is a further object to provide a stacker which can handle severely mutilated documents.

It is a further object to provide a stacker in accordance with the above objects which will not jam.

Another object of the present invention is to provide a stacker which will stack documents of varying sizes and thicknesses in a stack wherein one end of all of the documents is aligned.

A further object is to provide a stacker wherein there are no critical adjustments.

The invention described herein overcomes the disadvantages of the prior art devices by providing a system wherein (*a*) the documents are forced down into the stack by a power element which applies a distributed force over a large area of the document, said area extending over the entire length of the document; (*b*) substantially all of the forward motion of the documents is stopped before the documents engage the stack; (*c*) the documents are decelerated by a force which is applied to a surface area of the document rather than by a force applied to the leading edge of the document; (*d*) the force applied to decelerate the forward motion of the documents is not applied to the front edge of the documents; (*e*) the downward force applied to the documents is automatically varied to compensate for the different sized documents; (*f*) the documents are not made to slide over any substantial portion of the previously stacked documents; (*g*) the clearance between parts through which the documents are fed is enough so that even severely multilated documents will pass with ease.

As a result of the aforementioned features, the present invention is capable of stacking documents at an extremely high rate without jamming. Furthermore, the system is capable of handling without difficulty and at a high rate of speed documents of varying sizes and thicknesses (documents of varying sizes and thicknesses may be interspersed) and documents which are severely mutilated.

As previously stated, each document engages the stack only after substantially all of the forward motion has been eliminated; hence, the documents being stacked do not slide over any substantial portion of the stacked documents. This is a distinct advantage over systems wherein the front end of the documents is first made to engage the stack at some point, thereafter sliding along the stack and pivoting the rear end of the document down onto the stack. The location of the top of the stack can never be maintained exactly at an even level regardless of what kind of compensating device is used; hence, if the top of the stack is used as a pivot point, another variable is introduced into the system. Such variables can spell the difference between the successful operation or the constant jamming of a high-speed stacker. Furthermore, if some of the documents being stacked are punched hole cards (e.g. IBM cards) there is a tendency for the holes in the cards to prevent one card from sliding over another card; hence, it is a distinct advantage to have the documents not slide over any substantial portion of the stacked documents.

Adequate control of the swift downward movement of the documents is possible because the means which force the documents down into the stack operate on a large surface area of each document, said area extending over the entire length of each document.

The system can handle documents of varying sizes and thicknesses because the downward force of the documents is automatically adjusted to suit the size of the document being handled.

Mutilated documents can be handled because the clearance between all parts through which the documents are fed is substantial so that even the most severely mutilated documents will pass with ease.

Documents can be stacked in rapid succession without jamming because the deceleration of the forward motion of each document takes place over a very short space and as or before the forward motion of each document is decelerated, its rear end is moved away from the path of the next incoming document.

The foregoing and other objects, features and advantages of the invention will be apparent from the following more particular description of preferred embodiments of the invention, as illustrated in the accompanying drawings.

Figures 3A, 3B, 3C:
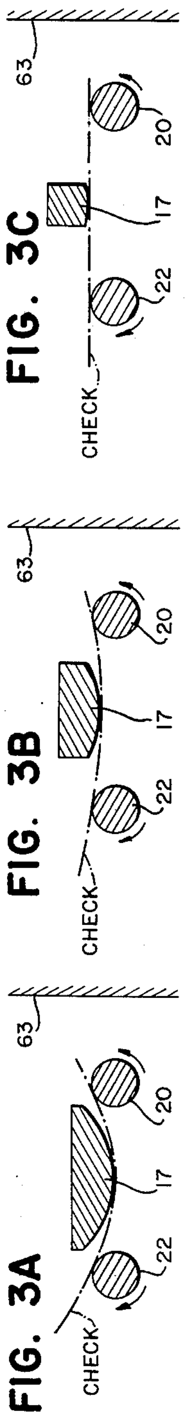
Figure 2:
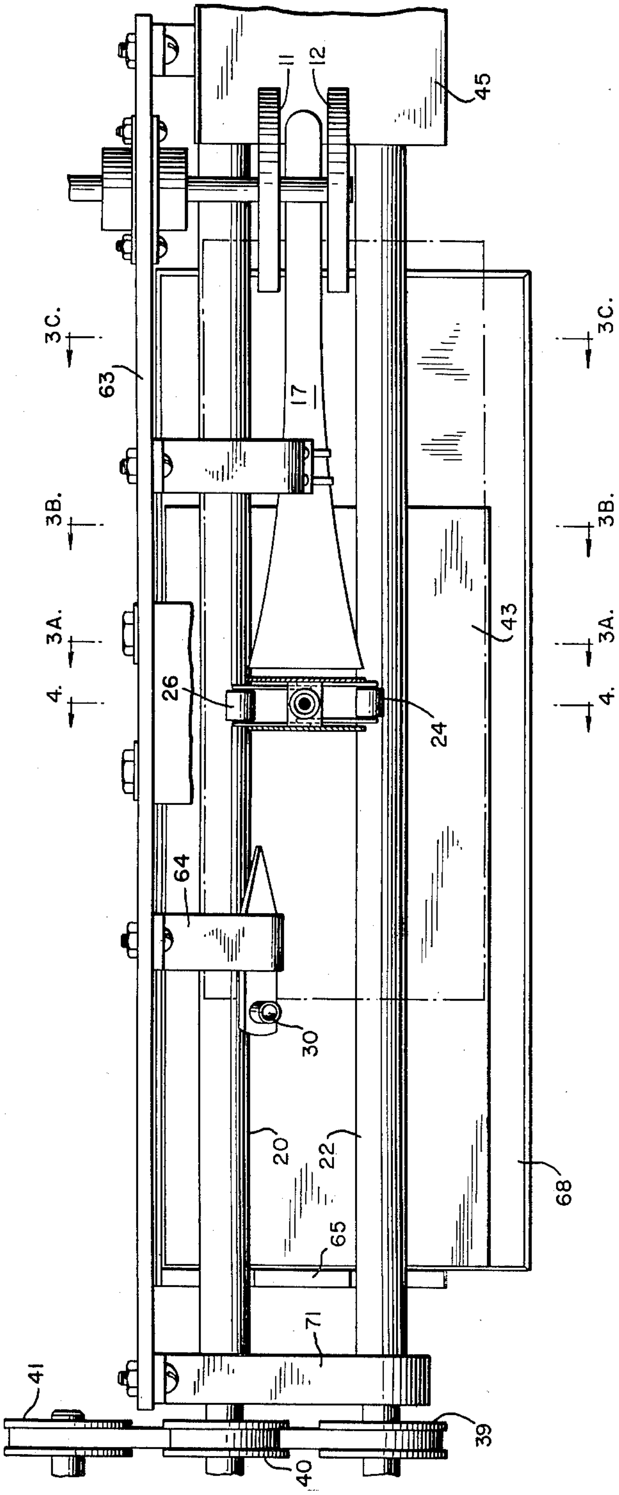
FIG. 2 is a detailed view of the power rollers, the pinch rollers, and the document guide for the first embodiment.

FIGS. 3*a*, 3*b*, 3*c*, are sectional views of the document guide and power rollers respectively taken along lines 3*a*—3*a*, 3*b*—3*b*, and 3*c*—3*c* in FIG. 2

Figure 4:
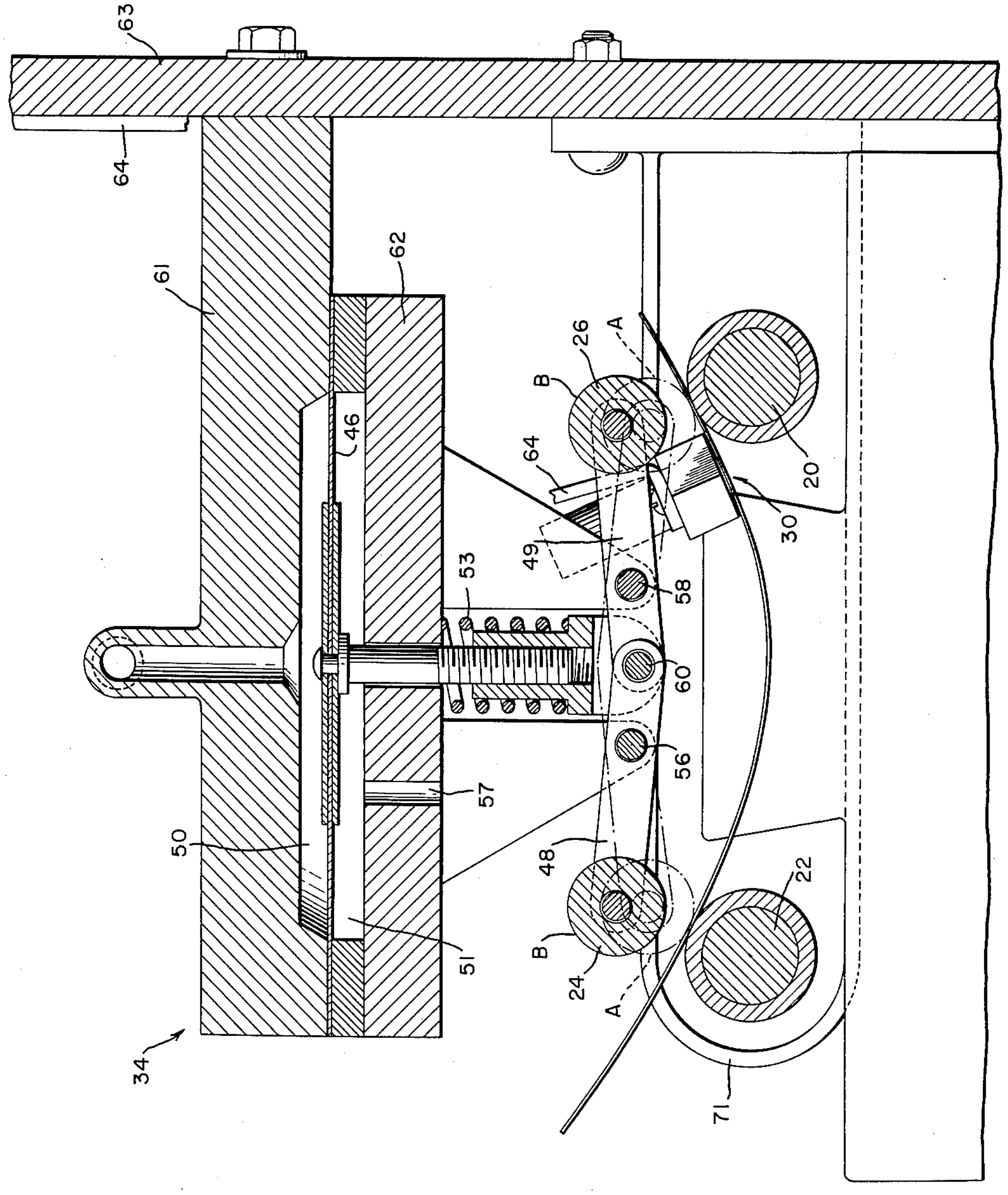

FIG. 4 is a sectional view of the pinch rollers and of the vacuum diaphragm taken along line 4—4 in FIG. 2.

Figure 5:
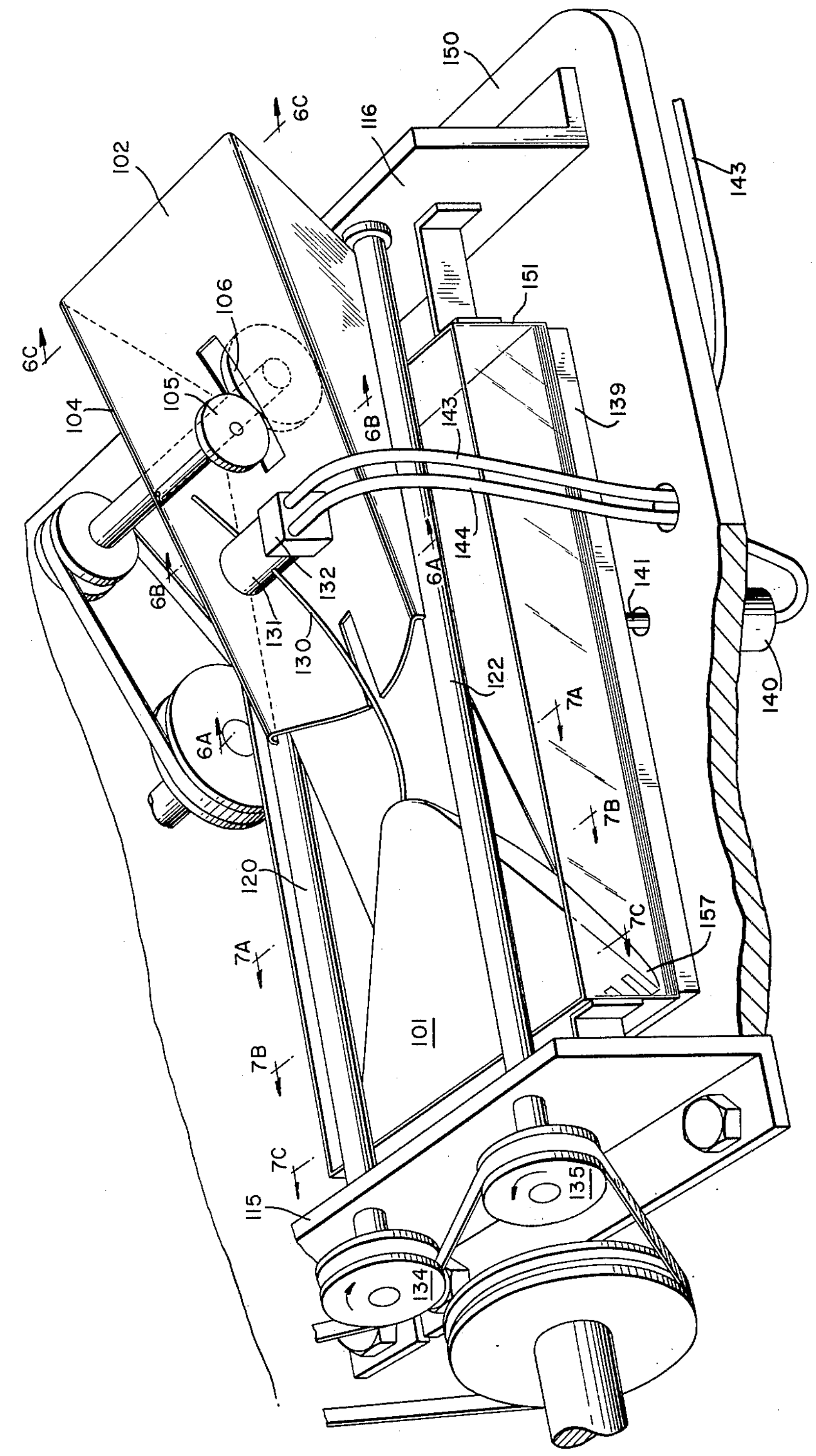

FIG. 5 is a perspective diagram of a second embodiment.

Figure 6A:
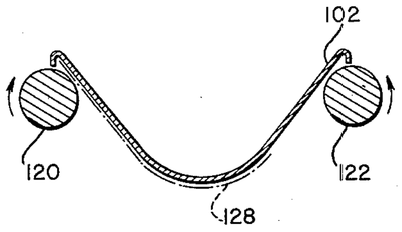
Figure 6B:
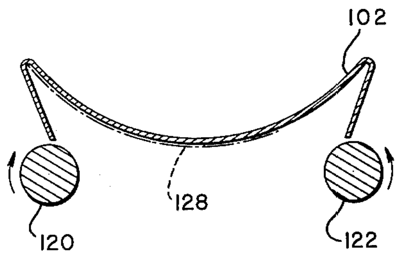
Figure 6C:
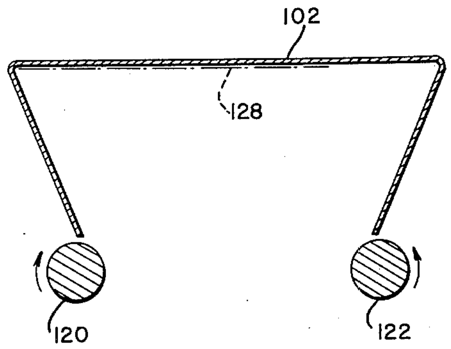

FIGS. 6a, 6b and 6c are sectional views of the document guide for the second embodiment respectively taken along lines 6a—6a, 6b—6b, and 6c—6c in FIG. 5.

Figure 7A:
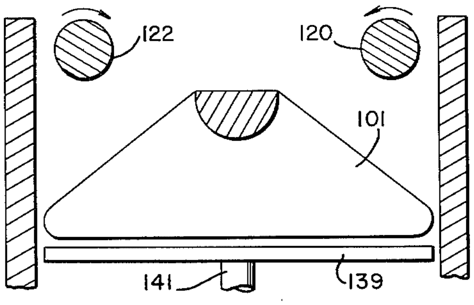
Figure 7B:
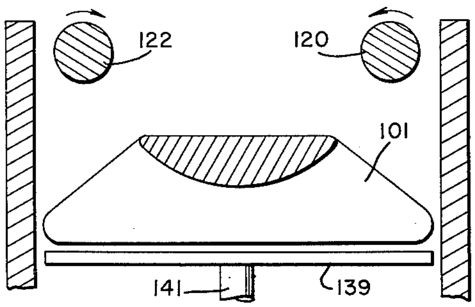
Figure 7C:
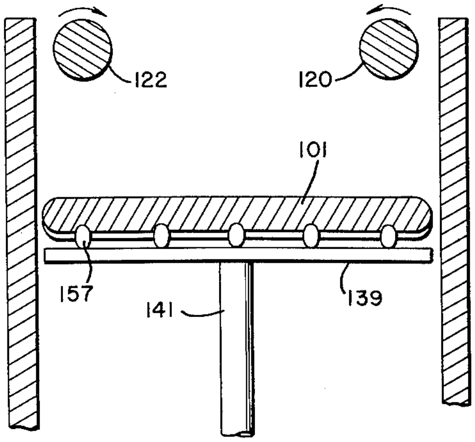

FIGS. 7a, 7b and 7c are cross-sectional views of the decelerating spoon for the second embodiment taken along lines 7a—7a, 7b—7b, and 7c—7c in FIG. 5.

In general, in the system shown herein, each document is removed from the path of the next incoming document by two cylinders which are rotating at a high speed. The surfaces of the cylinders engage the surface of the document along the lateral edges of the document (those edges which are parallel to the direction of motion) forcing the lateral edges inward and downward.

The rotating cylinders, hereinafter called the power rolls, engage a large surface area of each document. Furthermore, the area which the power rolls engage is spread over the entire length of each document, thereby facilitating control of the movement of the documents.

The first specific embodiment of the device, which is shown in FIGS. 1, 2, 3 and 4 will now be described generally.

The features peculiar to this embodiment are that the documents remain essentially parallel to the transport line as they are moved away from the transport line and that the force which is applied to decelerate the forward motion of each document is applied somewhere between the center and the rear end of the document, depending on the length of the document.

The documents are fed into the device by the drive wheels 11, 12 and 13. As the documents enter the stacker, they are slightly cupped by the guide 17 to increase their rigidity and to prevent them from cupping upward. Thereafter, the documents slide over the power rolls 20 and 22 passing underneath the pinch rollers 24 and 26 (which are raised at this time) and underneath the air port 30.

When a document passes under the air port 30, it partially closes the port and the vacuum created by a vacuum pump (not shown) which is attached to line 32 actuates the diaphragm mechanism 34, thereby lowering the pinch rollers 24 and 26 toward the power rolls 20 and 22. The resulting pressure on the surface of the document decelerates the forward motion of the document and, furthermore, the rotation of the power rolls 20 and 22 tends to force the lateral edges of the document inward and downward.

The location of the air port 30 can be adjusted so that the pinch rollers 24 and 26 engage the documents at a point somewhere between the center and the rear end of the document, depending on the length of the document. Hench, any tendency for the document to collapse (like an accordion) is eliminated.

The power rolls 20 and 22 rotate at high speed in such a direction (as indicated by the arrows on pulleys 39 and 40) that their top surfaces are moving towards the center of the stacker. As the documents enter the stacker, sliding over the power rolls, the tendency is to maintain the downward cupped formation which was initiated by the guide 17.

The documents remain substantially parallel to the transport line as they pass through the power rolls 20 and 22 and, furthermore, they remain substantially parallel to the stacked documents 43 as they approach and engage the top of the stacked documents 43. Hench, there is no need to have the forward end of the moving documents first engage the top of the stack (which is at a variable height and which would be at a slightly variable height even if a compensating system were used) and to thereafter pivot the rear end of the document into the stack; nor is there any need for the document to slide along over the other stacked documents where they might jam due to the punched holes which may be in the other documents.

The power rolls 20 and 22 act on a large area of each document and this area is distributed over the entire length of the document, thereby facilitating control of the movement of the document, especially documents which are severely mutilated. The force which is applied on any particular part of a document which is mutilated is not transmitted to the other portions of the document in any predictable or controllable manner; hence, the most satisfactory manner of applying force to a mutilated document in order to move such a document is to apply a force which is distributed over a large surface area of the document. The power rolls 20 and 22 do distribute the force over a large area on the document and not only is the force distributed over a large area, but the area is distributed over the entire length of the document.

The device shown automatically compensates for the varying amount of force needed to push the documents down into the stack. Naturally, since the large documents have more surface area, they have more of a tendency to float, hence more force in needed to push them down into the stack. However, in the device shown herein, a large force in automatically applied to the larger documents since they are in contact with the power rolls longer and since a larger area of the document is in contact with the power rolls.

As an example of the system's ability to handle documents of varying sizes and thicknesses, the specific device shown herein has been successfully operated with documents varying in size between 6 by 2.5 inches to 9 by 3.5 inches and in thicknesses between 0.008 and 0.003 inch, documents of the various sizes being interspersed.

It should be noted that the foregoing discussion related mostly to the force that pushes the documents down into the stacker rather than the force which decelerates the forward motion of the document. The major decelerating force (i.e., that due to the pinch rollers 24 and 26) is distributed over a much smaller area of the document than the force from the power rolls 20 and 22 which pushes the documents down into the stack. However, even this decelerating force is applied to a surface area of the documents rather than to the leading edge of the documents. Furthermore, the decelerating force is applied somewhere between the center and the rear end of the documents, depending on their length thereby preventing them from collapsing like accordions.

A more detailed description of the first embodiment of the invention will now be given.

A transport system (not show) feeds the documents into the stacker over table 45. They are then grasped by the drive wheels 11, 12, and 13, which constitute the last positive drive into the stacker, and they are fed into the stacker under the guide 17, under the pinch rollers 24 and 26, and over the power rolls 20 and 22. The guide 17 cups the documents downward slightly in order to add rigidity to the documents and in order to prevent them from cupping upward later under the pressure from the power rolls 20 and 22. The shape and position of the guide 17 is shown in FIG. 2 and in FIGS. 3a, 3b, and 3c. Figs. 3a, 3b, and 3c are sectional views respectively taken along lines 3a—3a, 3b—3b, and 3c—3c in FIG. 2.

When each document is fed into the stacker the pinch rollers 24 and 26 are raised from the power rolls 20 and 22 by an amount sufficient to allow the most mutilated documents to pass between the power rolls 20 and 22 and the respective pinchrollers 24 and 26.

In the specific embodiment shown herein, the power rolls are constructed with a hard rubber surface to obtain a better frictional grip between the power rolls and the documents. The quality of the surface of the power rolls (their coefficient of friction) determines the force with which the documents will be forced down into the stack. The power rolls are rotated by the power source (not shown) through drive pulleys 39, 40 and idler pulley 41. The direction of rotation of the power rolls is such that the top surface of each power roll moves toward the center of the stacker. That is, the power rolls could be said to be contrarotating. The surface speed of the power rolls is in the vicinity of 1,000 feet per second. The power rolls 20 and 22 are mounted in the bearings 71 and 72. The bearings 71 and 72 are in turn mounted on the base support 63.

Although hard rubber rolls are somewhat sticky, the documents entering the stacker have little difficulty sliding over them since the surfaces of the power rolls are moving very fast in a direction perpendicular to the forward direction of the documents.

When a document reaches the sensing port 30, the presence of the document cuts off the flow of air to the port, thereby activating the diaphragm assembly 34 which forces the pinch rollers 24 and 26 down against the power rolls 20 and 22. The joint action of the pinch rollers 24 and 26 and the power rolls 20 and 22 decelerate the forward motion of the documents and the power rolls force the documents down into the stack.

As the documents are pulled away from the sensing port 30, the diaphragm assembly 34 releases the pinch rollers 24 and 26 and they return (under the action of a spring to be discussed later) to their raised position approximately one quarter of an inch away from the power rolls 20 and 22.

It is the leading edge of the documents which is sensed since it is desirable that the forward edge of the stacked documents be aligned. Regardless of the length of the documents if their forward motion is stopped when their leading edge is at the same place in the stacker, naturally the leading edges of the documents in the stack will be aligned.

Figure 1:
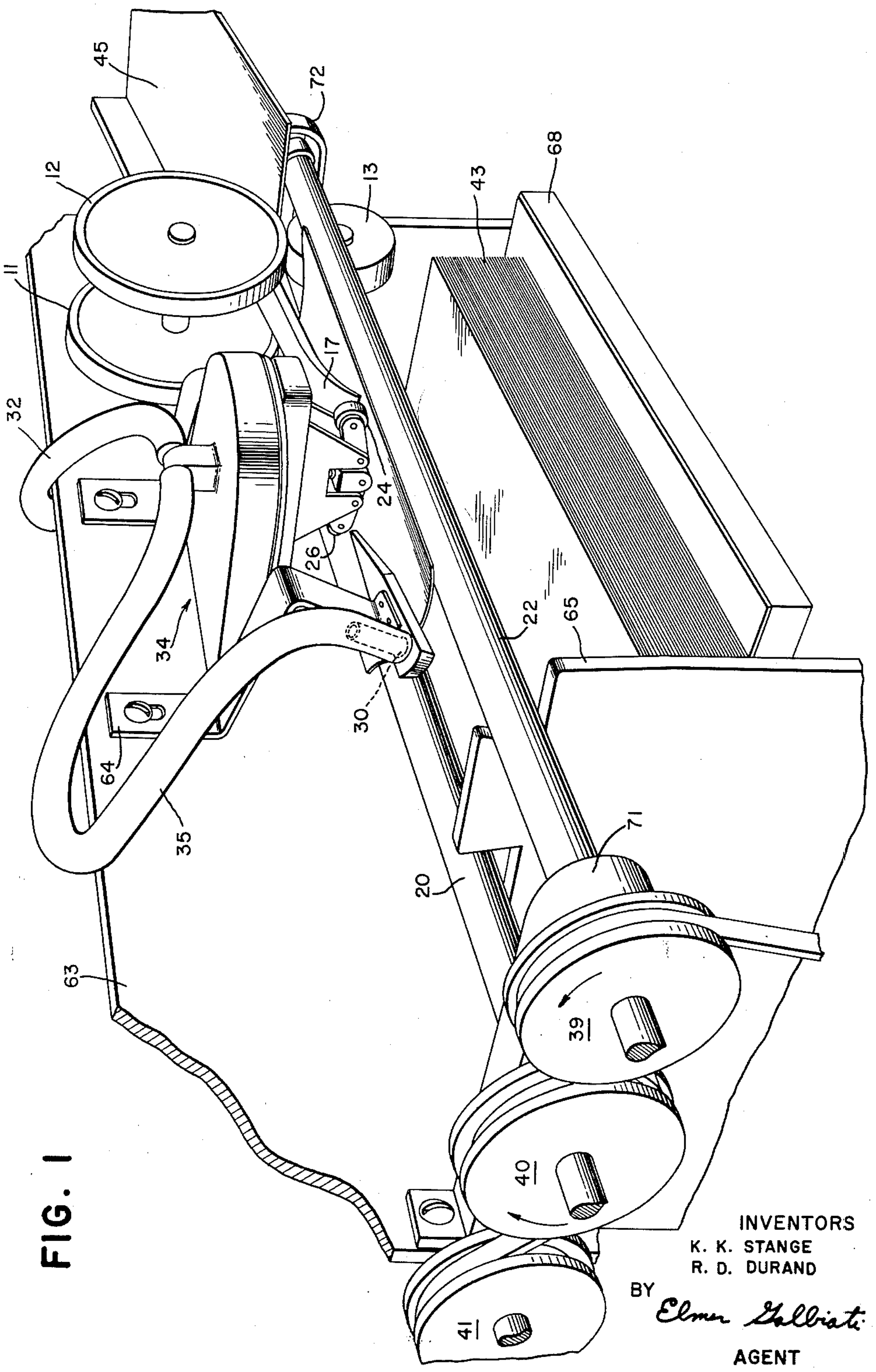
FIG. 1 is a perspective view of the first embodiment.

In the specific embodiment shown in FIG. 1, the sensing port is located four inches from the position where it is desired to align the forward edges of the documents. This four inches represents the time lag between when the sensing port 30 is closed by a document and when the pinch rollers 24 and 26 finally dispel most of the forward momentum of the document.

The last small bit of forward momentum of each document is dispelled when the document engages the end plate 65. However, the amount of momentum remaining after the document has been decelerated by the pinch rollers 24 and 26 and the power rolls 20 and 22 is insignificant as far as causing any damage to the document when it engages the end stop 65. This small amount of forward momentum merely insures that the front end of the documents will be aligned.

The vacuum sensing system comprises an open port 30 to which a continuous vacuum is applied by a vacuum source (not shown). When the leading edge of the document closes off the vacuum port 30 the decrease in pressure in the line behind the port acts upon the diaphragm assembly 34 which will now be explained in detail.

The diaphragm assembly is shown in a detailed sectional view in FIG. 4. The engaged position of the pinch rollers is shown by dotted lines and designated by a capital A and the disengaged position of the pinch rollers is shown by solid lines and designated by a capital B. In the specific embodiment shown herein the pinch rollers travel approximately one quarter of an inch between the engaged and the disengaged positions.

When the sensing port 30 is not closed by a document there is substantially no vacuum in cavity 50. Hence, there is no pressure differential between cavity 50 and cavity 51 (cavity 51 open to atmospheric pressure through port 57). The diaphragm is therefore in its normal unstressed position and the compression spring 53 acts to raise the pinch rollers 24 and 26 to position B. The arms 48 and 49 which support the pinch rollers are mounted on the fixed pivots 56 and 58. Hence, the spring 53 forces the movable pivot 60 down and the pinch rollers are raised to position B.

When a document closes the sense port 30 a vacuum is created in chamber 50 by the vacuum source (not shown). The diaphragm 46 is then pulled up against the pressure of spring 53 and the pinch rollers 24 and 26 are forced down to position A.

In the specific embodiment shown herein the pinch rollers 24 and 26 are constructed of nylon. Nylon has been found to be a desirable material for the pinch rollers because it has a sufficient amount of frictional drag when it is in engagement with the documents; however, many other materials could be used.

By controlling the relative magnitude of the vacuum applied to cavity 50 and the size of the spring 53, the time constant of the vacuum control circuit can be regulated to control the time lag between when a document is sensed and when its forward motion is terminated by the pinch rollers 24 and 26.

The sensing port 30 is located near one of the pinch rollers in order to obtain more uniform sensing. The sensing port 30 is mounted on the bracket arm 64 which is in turn mounted on the support wall 63.

The documents are stacked in the pocket formed by the wall 63 which is the base plate for the entire assembly, the end plate 65, and the fixed bottom plate 68.

The plate 68 could be supported by a piston arrangement (similar to that shown in the second embodiment) which would lower the plate as the pocket becomes full. In the embodiment shown here such is not necessary unless it is desired to accumulate a very large number of documents before emptying the pocket.

The vacuum sensing and actuating mechanism here shown in only meant to be illustrative and it is contemplated that any other sensing and actuating mechanism such as a photocell with an electromagnetic coil arrangement could be used.

An alternate embodiment of the stacker is shown in FIGS. 5, *6a*, *6b*, *6c*, *7a*, *7b* and *7c*. The second embodiment as shown in FIG. 5 has the same type of power rolls as does the first embodiment shown in FIG. 1. However, the second embodiment does not utilize the pinch rollers to decelerate the forward motion of the documents. Instead the second embodiment uses the spade 101 as a decelerating means.

In the second embodiment, the documents are fed into the stacker through the guide 102. The last positive forward drive which the documents receive is from the drive wheels 105 and 106. Thereafter, the document guide 102 severely cups each document before it is brought into contact with the power rolls 120 and 122.

The power rolls 120 and 122 which are rotating in the same direction as the power rolls in the first embodiment (i.e., contrarotating) force the documents down into the stacker. In this embodiment the documents do not enter the stacker parallel to the power rolls or to the final stack. Instead they enter the stacker at an angle. They then engage the spade 101 which decelerates the documents and pivots the rear end of the documents down through the power rolls and into engagement with the stack. The document guide 102 and the spade 101 are designed so that the front end of the documents engage the stack near the end of the stack, thereby eliminating any necessity of having the front end of the documents slide over any substantial portion of the other documents.

The specific shape and position of the guide 102 is shown in the cross-sectional views *6a*, *6b* and *6c* which were taken respectively along lines *6a—6a*, and *6b—6b*, and *6c—6c* in FIG. 5.

The spoon shaped spade 101 decelerates the document not by applying force to the leading edge, but by applying a force to the entire forward surface of the document. The force applied by the spade to the front surface tends to decup the documents; however, since the rear end of the documents is being maintained in a cup configuration by the power rolls (which simultaneously force the rear end of the documents down into the stacker) there is a resistance to the decupping and hence a force on the surface of the document which decelerates the forward motion. The shape of the decelerating spade 101 and its position in relation to the power rolls is shown in FIGS. *7a, 7b* and *7c* which are cross-sectional views respectively taken along lines *7a—7a, 7b—7b,* and *7c—7c* in FIG. 5. It is important to note that the spoon shaped spade operates on the surface of each document in the vicinity of the forward end of the document, rather than acting on the forward edge of the document. When the forward end of each document first encounters the forward end of the spade the configuration of the document substantially matches the configuration of the spade and no force is applied to the document; however, as the document continues to travel along the triangular spoon shaped surface of the spade, the spade tends to flatten out the document. This decupping causes the spade to push against the surface of the document and the resulting friction naturally tends to decelerate the document. By the time a document reaches the forward end of the spade it will have been almost completely decelerated and the rear end of the document will have been forced down through the power rolls, hence, the stacker will be free to accept the next document.

It should be noted that the documents engage, slide along, and pivot about the spoon 101. They do not slide along the surface of the stacked documents for any substantial distance. Naturally, near the end of the spade, the front end of a document which is entering the stacker does come into contact with the top of the stacked documents of a very slight distance. However, by the time a document reaches this position it has been sufficiently decelerated by the spade that the front end of the document will not be damaged by the contact. Furthermore, there are never any holes in the document this close to the end; hence there is no danger that the document entering the stacker will bind when it engages the stacked documents.

The fingers 157 which are mounted on the end of spade 101 prevent the documents from rebounding when they finally engage the end of the stacker. These fingers may be made of rubber or of a plastic which is flexible and which has a relatively high coefficient of friction. The fingers 157 are the only portion of the spade 101 which rests on the stacked documents. The spade which may be made from nylon or other suitable plastic is mounted on a pivot arm 130 which is rotatably mounted on the fixed block 132 by a rotatable member 131. The block 132 contains a valve which connects the tubes 143 and 144. The tube 143 is connected to a source of compressed air (not shown) and as arm 130 lifts up, the valve is closed, decreasing the amount of air which can pass from tube 143 to tube 144. The valving mechanism therefore essentially senses the position of the spade and, hence, the position of the top of the stack of documents. Block 132 is supported by a fixed bracket (not shown) which is attached to the base board 150.

The bottom of the stack of documents rests on the movable base 139 and the stack is enclosed by the fixed sides 151. The base 139 is supported by the piston 141 which fits into cylinder 140. As the amount of air which is allowed to pass between the tube 143 and the tube 144 is decreased the piston 141 goes lower in the cylnder 140 and vice versa. Hence, the top of the stack is maintained at an essentially uniform position.

The shape of the document guide 102 is shown in greater detail in the cross-sectional views *6a, 6b* and *6c*. These views are respectively taken along lines *6a—6a, 6b—6b,* and *6c—6c* in FIG. 5.

The drive wheels 105 and 106 are rounded so that each document which enters the guide 102 will tend to align itself in the center of the guide. However, as the documents are fed into the stacker they are aligned along edge 104 of the guide 102. The guide 102, the power rolls 120 and 122, the drive wheels 105 and 106 and the spade 101 will tend to force the document toward the center of the stacker, and by the time the forward motion of the document is terminated, the document will have been moved to the center of the stacker.

Power rolls 120 and 122 are mounted in the support bearings 115 and 116 and they are driven by a power source (not shown) through pulleys 134 and 135. The bearings 115 and 116 and the piston 140 are mounted on the base board 150.

While the invention has been particularly shown and described with reference to preferred embodiments thereof, it will be understood by those skilled in the art that various changes in form and details may be made therein without departing from the spirit and scope of the invention.

We claim:

1. A power stacker for documents, said stacker comprising in combination two parallel rotating cylinders, said cylinders being separated from each other by a distance which is slightly less than the width of the narrowest document to be stacked, means for feeding said documents individually in succession across the top of said cylinders in a direction generally parallel to the axis of rotation of said rotating cylinders, said feeding means including means for biasing each of said documents toward the top surfaces of said cylinders as the document is passed thereacross, the direction of rotation of said cylinders being such that their top surfaces move toward each other, whereby documents fed onto the top of said cylinders are forced down between said cylinders, and means in the feed path for gradually decelerating the feeding motion of said documents.

2. The stacker recited in claim 1 wherein said decelerating means includes means for sensing that a document has reached a predetermined position on said rotating cylinders, a pinch roll for each rotating cylinder, said pinch rolls being supported for movement toward and away from their corresponding cylinders, means for normally maintaining said pinch rolls away from said cylinders, whereby documents may be fed between said pinch rolls and said cylinders, and power means responsive to said sensing means for pressing each pinch roll toward the associated rotating cylinder, whereby the forward motion of a document whose presence is sensed by said sensing means is decelerated.

3. The stacker recited in claim 1 including stationary means for progressively cupping the middle of said documents in a downward direction as they are fed across said rotating cylinders.

4. The stacker as recited in claim 1 wherein said means for feeding said documents include a document guide, said guide being adapted to progressively cup the middle of said documents in a downward direction and to guide said document downward so as to force the leading edge of each document between said rotating cylinders; and wherein said decelerating means comprises a triangularly shaped spade adapted to come into contact with the leading surface area of each document as it passes between said cylinders and to apply a decupping force thereto.

5. The stacker as recited in claim 4 including a fixed end stop for terminating the feeding motion of said documents, and a plurality of resilient fingers on an end of said spade for preventing said documents from rebounding from said end stop.

6. The stacker as recited in claim 4 wherein the underside of the front end of said spade is shaped substantially similar to the shape of the leading edge of said cupped documents, and wherein the rear end of said spade is substantially flat across the entire width of said stacker, the cross section of said spade gradually changing between said front end and said rear end.

7. A document stacking device for removing documents from a transport line and for placing said documents in a stack, said device comprising in combination: two parallel rotating cylinders, the direction of rotation of said cylinders being such that the top surface of each cylinder moves toward the center of said stacker; stationary means for temporarily cupping each document with a depressed center portion as it passes from said transport line; means including said stationary means for successively feeding said documents from said transport line onto the top surfaces of said cylinders with said depressed portion therebetween, said cylinders being spaced so as to provide further temporary cupping of said documents as they pass therebetween; and means cooperating with said cylinders to progressively decelerate the feeding motion of said documents.

References Cited in the file of this patent

UNITED STATES PATENTS

| | | |
|---|---|---|
| 190,596 | Johnson | May 8, 1877 |
| 1,458,463 | Braunstein | June 12, 1923 |
| 1,916,723 | Ferrar | July 4, 1933 |
| 2,106,953 | Ludewig | Feb. 1, 1938 |
| 2,470,762 | Dickenson | May 24, 1949 |